(No Model.)

H. BODENSTEIN.
CUTTER FOR ICE PLOWS.

No. 449,517.  Patented Mar. 31, 1891.

Witnesses:

Henry Bodenstein, Inventor:
By Wm. N. Moore, Attorney.

UNITED STATES PATENT OFFICE.

HENRY BODENSTEIN, OF STAATSBURG, NEW YORK.

CUTTER FOR ICE-PLOWS.

SPECIFICATION forming part of Letters Patent No. 449,517, dated March 31, 1891.

Application filed June 26, 1890. Serial No. 356,852. (No model.)

*To all whom it may concern:*

Be it known that I, HENRY BODENSTEIN, a citizen of the United States, residing at Staatsburg, in the county of Dutchess and State of New York, have invented certain new and useful Improvements in Cutters for Ice-Plows; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in cutters or blades for ice-plows, and has a special reference to what I term an "inserted-tooth cutter."

The leading object of my invention is the provision of a cutter which will be thoroughly efficient in operation, strong and durable, and inexpensive of production.

A further object is a provision of a cutter the teeth of which can be readily inserted and removed, which will strengthen the body of the cutter, and which cannot possibly become detached while in use.

To attain the desired objects my invention consists of the improved cutter and teeth, substantially as herein illustrated, described, and specifically defined and distinguished by the claims.

Figure 1:
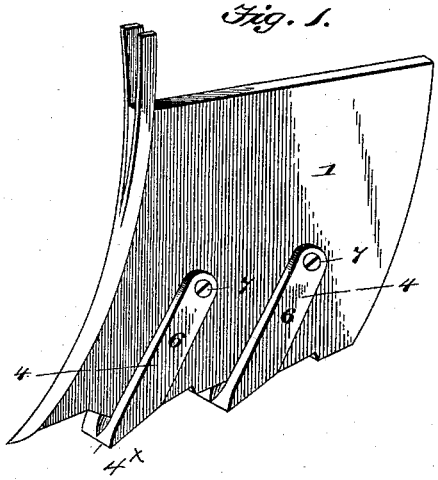
Figure 2:
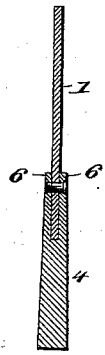
Figure 3:
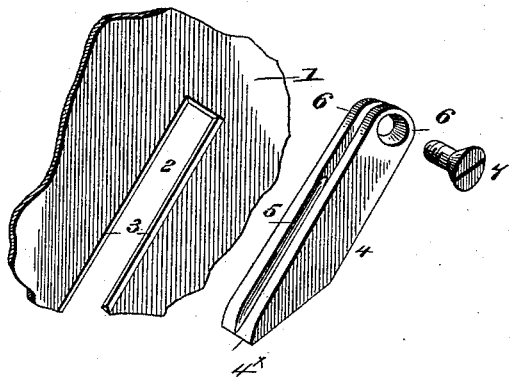
Figures 4, 5:
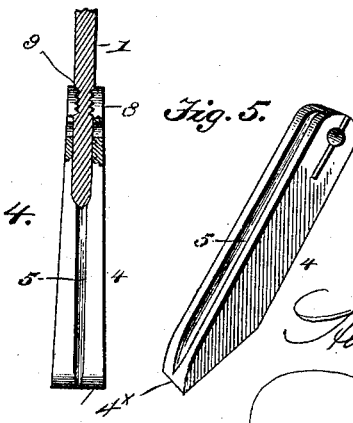

Figure 1 represents a perspective view of a cutter constructed in accordance with and embodying my invention. Fig. 2 represents a sectional view thereof. Fig. 3 represents a perspective view of a portion of the cutter and tooth detached. Figs. 4 and 5 represent views of modified forms of the cutter.

Referring by numerals to said drawings, in which corresponding figures denote similar parts, the numeral 1 designates the cutter, which is made of thin metal of the proper thickness and provided with a series of inclined throats, recesses, or kerfs 2, the side walls 3 of which are formed tapering or beveled, and 4 designates the tooth fitting in said throats and having its side walls formed with beveled channels 5, which receive the beveled walls of the throats. The teeth are of oblong or rectangular form and are made thick to give them the required strength. The lower end of the teeth are rearwardly inclined, forming the sharp-pointed front edge $4^\times$, which causes the tooth to readily cut into the ice. From this construction it will be seen that the teeth fit snugly in the cutter and are not allowed any play, and, moreover, serve to brace and strengthen the body of the cutter. The upper end of the tooth is bifurcated, providing the two lips 6, and is provided with an opening through said lips, which is screw-threaded to receive the clamping-screw 7, which causes the lips to clamp against the cutter, and thus secure the teeth firmly in place.

If desired, I may provide the lips with barbs 8 to engage recesses 9 in the cutter-blade, and thus retain the teeth in place in the cutter. If desired, I may also form the teeth with such lips as are shown in Fig. 4.

From the foregoing description it will be readily seen that I provide a cutter in which the teeth are securely held in place, which allows the teeth to be removed and inserted with ease, which is of inexpensive and durable construction, and which is thoroughly efficient for the purpose intended.

I claim as my invention—

1. A cutter or blade for ice-plows, having a series of oblong throats having their side walls beveled the full length thereof, teeth fitting in said throats and having their upper ends split, forming lips, and screws passing through said lips for securing the teeth in the throats, said teeth being thicker than the blade and having their lower ends inclined to provide the front sharp cutting-edge, as shown.

2. A cutter or blade for ice-plows, consisting of the blade proper having a series of oblong or rectangular throats inclined with reference to the blade, oblong teeth thicker than the blade fitting in said throats and having their upper ends split or bifurcated and their lower ends inclined to form a cutting-edge, and screws or bolts engaging the split ends of the teeth to secure them in the blade, as stated.

In testimony whereof I affix my signature in presence of two witnesses.

HENRY BODENSTEIN.

Witnesses:
C. H. PIER,
WM. CLARKE.